B. F. SCHIRMER.
SHOCK ABSORBER.
APPLICATION FILED JULY 30, 1918.
1,297,014.
Patented Mar. 11, 1919.
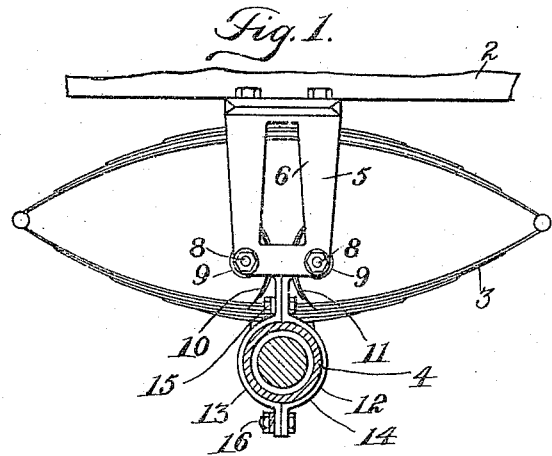
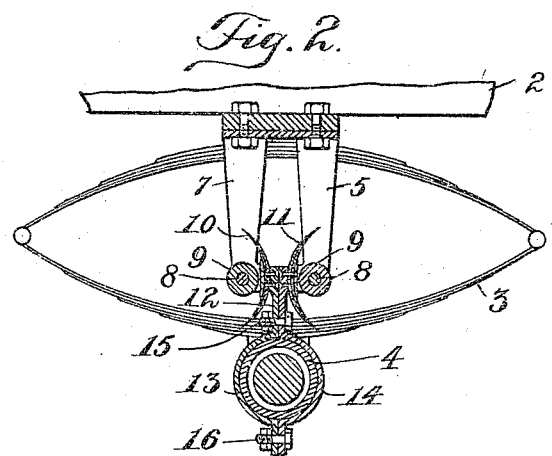
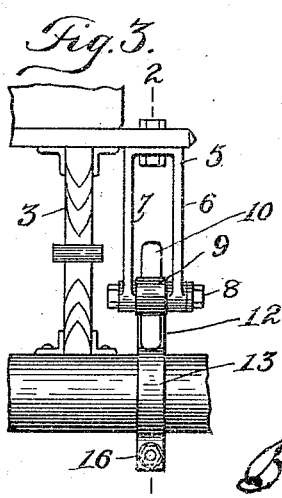
Inventor:
B. F. Schirmer
By his Attorney

# UNITED STATES PATENT OFFICE.

BALDWIN F. SCHIRMER, OF NEW YORK, N. Y.

SHOCK-ABSORBER.

1,297,014.　　　　　Specification of Letters Patent.　　Patented Mar. 11, 1919.

Application filed July 30, 1918. Serial No. 247,399.

*To all whom it may concern:*

Be it known that I, BALDWIN F. SCHIRMER, a citizen of the United States, residing at New York city, in the county of New York and State of New York, have invented certain new and useful Improvements in Shock-Absorbers, of which the following is a specification.

This invention relates to shock absorbers, the object of the invention being to provide an improved shock absorber, simple in construction, easy of application and particularly efficient in use and which improved shock absorber may be applied to various forms of cars.

In the drawings accompanying and forming a part of this specification, Figure 1 is a side elevation of this improved shock absorber. Fig. 2 is a section taken on line 2—2 of Fig. 3 and Fig. 3 is an end view thereof. Similar characters of reference indicate corresponding parts in the several figures of the drawings.

In the present improvement, two duplicate shock absorbers of the character shown and described are used at the rear end of the car and therefore a description of one of them is deemed sufficient.

In the drawings 2 represents the body of the car; 3 the ordinary full elliptic spring and 4 the rear axle. Bolted to the body of the car is a yoke or hanger 5, comprising two pairs of connected spaced arms 6 and 7 connected at their lower ends by a pair of suitable bolts 8 forming pivots for a pair of rollers 9 adapted to contact at the proper time with a pair of semi-elliptic or arcuate springs 10 and 11 usually made up like the springs 3 of a plurality of leaves, each bolted to a bracket 12, which in the present instance comprises a two part bracket to each part of which a spring is bolted. This bracket is formed with a pair of clamping portions 13 and 14 which by means of bolts 15 and 16 may be readily clamped around the axle thus providing a very simple, inexpensive and efficient shock absorber easily applied to a motor car and one which is durable in use.

The lower connected ends of the yoke form guides for the sides of the semi-elliptic shock absorbing springs and this to a certain extent prevents sidewise sway of the car body.

In practice, the movement of the body and axle, toward or from each other causes a relative movement of the rollers carried by the hanger and the elliptic shock absorbing springs so that such springs will be compressed toward each other when the body and the axle move either toward or from each other so that the shock absorber is a double acting one, and the greater the movement of the body and axle toward or from each other, the higher the efficiency of the shock absorber, in other words, the greater the resisting power of the springs.

In practice, the position of the parts is such that during the normal position of the body and axle, the rollers are held away from the spring.

It will be observed from the foregoing that the present improvement comprises a very simple form of shock absorber wherein the necessity for using coiled springs and numerous mechanical elements is entirely avoided.

Various details may, of course, be more or less changed without departing from the substance and scope of the present improvement.

I claim as my invention:

1. A single shock absorber comprising a pair of supporting means, one adapted for attachment to the body of a vehicle and the other to the axle thereof one directly above the other, one carrying a pair of upright semi-elliptic springs, and the other rollers for engaging the same, the springs and rollers being located in juxtaposition whereby both springs are located at one and the same side of the vehicle body.

2. A single shock absorber comprising a pair of supporting means, one comprising a clamp and the other a pair of spaced arms, one directly above the other, one carrying a pair of upright semi-elliptic springs and the other a pair of rollers adapted to engage said springs to compress them, the springs and rollers being located in juxtaposition whereby both springs are located at one and the same side of the vehicle body.

3. In a shock absorber, the combination of a hanger adapted for attachment to the body of a vehicle, said hanger comprising a pair of spaced arms, a clamp adapted for attachment to the axle of the vehicle, rollers carried between the spaced arms of the hanger and a pair of semi-elliptic springs rigidly carried by the clamp between said rollers and adapted to be compressed on the up or down movement of the rollers.

4. In a shock absorber, the combination of a pair of supporting means, one comprising a hanger adapted for attachment to the body of a vehicle, said hanger comprising a pair of spaced arms, rollers carried at the lower end of said arms, a two part clamping bracket adapted to be secured to the axle of the vehicle, a pair of upright elliptic springs rigidly carried by said bracket and located between said arms and said rollers and adapted to be compressed during the movement of the rollers and the springs relative to each other in each direction.

5. A single shock absorber comprising a pair of supporting means each adapted for attachment to different parts of a vehicle, one directly above the other, a pair of upright semi-elliptic springs carried by one of said supporting means and a pair of rollers carried by the other for engaging and compressing said springs during the relative movement of the springs and the rollers, the springs and rollers being located in juxtaposition whereby both springs are located at one and the same side of the vehicle body.

6. A shock absorber comprising a pair of supporting means each adapted for attachment to different parts of a vehicle, one directly above the other, a pair of upright semi-elliptic springs carried by one of said supporting means and a pair of rollers carried by the other for engaging and compressing said springs during the relative movement of the springs and the rollers, the rollers being carried at the lower end of one of said supporting means and the springs at the upper end of the other said supporting means.

7. A vehicle having a pair of springs extending in a horizontal direction and a single shock absorber at each side of the vehicle each comprising a pair of independent semi-elliptic springs extending in an upright direction, and means for compressing said last springs.

8. A vehicle having a pair of semi-elliptic springs extending in a horizontal direction and a single shock absorber at each side of the vehicle each comprising a pair of supporting means adapted for attachment to two different parts of the vehicle one directly above the other, one of said supporting means carrying a pair of independent upright semi-elliptic springs and the other carrying means for compressing said springs.

9. A single shock absorber, comprising a pair of supporting means, one adapted for attachment to the body of a vehicle and the other to the axle thereof one directly above the other, one carrying a pair of upright semi-elliptic springs and the other rollers for engaging the same at the concave sides thereof, the springs and rollers being located in juxtaposition whereby both springs are located at one and the same side of the vehicle body.

10. In a shock absorber, the combination of a pair of supporting means, one adapted for attachment to one part of a vehicle and the other to another part thereof, one carrying a pair of upright semi-elliptic springs located with the convex faces thereof toward each other and the other carrying means for simultaneously engaging the concave sides of said springs thereby to compress said springs when said supporting means move either toward or from each other.

11. A single shock absorber comprising a pair of supporting means, one adapted for attachment to the body of a vehicle and another to the axle thereof, one directly above the other, one carrying a pair of upright semi-elliptic springs each of said springs comprising a plurality of leaves, and the other rollers for engaging the same, the springs and rollers being located in juxtaposition whereby both springs are located at one and the same side of the vehicle body.

12. A single shock absorber comprising a pair of supporting means one adapted for attachment to one part of the vehicle and the other to another part thereof, one directly above the other, one carrying a pair of upright semi-elliptic springs located with the convexed faces thereof toward each other, each of said springs comprising a plurality of leaves, and the other carrying means for simultaneously engaging the concaved sides of said springs thereby to compress said springs when said supporting means move either toward or from each other.

Signed at Park Row Building, New York city, county and State of New York, this 29th day of July, 1918.

BALDWIN F. SCHIRMER.

Copies of this patent may be obtained for five cents each, by addressing the "Commissioner of Patents, Washington, D. C."